Figure 1:
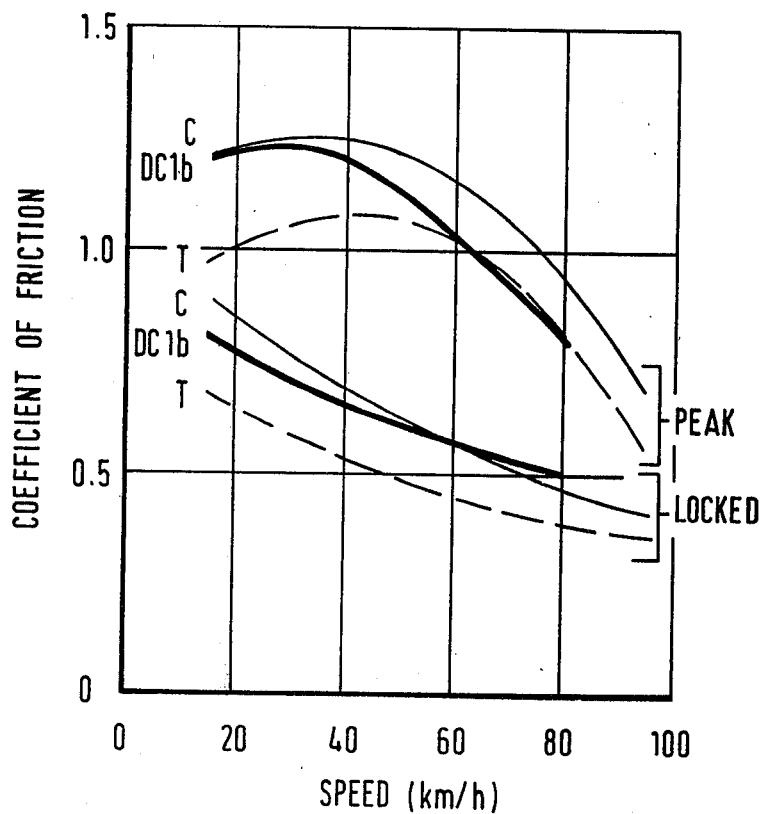

United States Patent [19]

Bond et al.

[11] 4,373,069

[45] Feb. 8, 1983

[54] ELASTOMER COMPOSITIONS

[75] Inventors: Robert Bond, Staffordshire; Robert J. Blythe, Birmingham, both of England

[73] Assignee: Dunlop Limited, London, England

[21] Appl. No.: 70,406

[22] Filed: Aug. 28, 1979

Related U.S. Application Data

[63] Continuation of Ser. No. 937,194, Aug. 28, 1978, abandoned.

[30] Foreign Application Priority Data

Sep. 9, 1977 [GB] United Kingdom ............... 37823/77

[51] Int. Cl.³ .......................... C08L 7/00; C08L 9/00; C08L 9/06
[52] U.S. Cl. ................................. 525/237; 152/209 R
[58] Field of Search ............................ 260/5; 525/237

[56] References Cited

U.S. PATENT DOCUMENTS 3,245,452  4/1966  Scott .
4,124,546  11/1978  Rubio, Jr. et al. ..................... 260/5

FOREIGN PATENT DOCUMENTS

| 1167677 | 4/1964 | Fed. Rep. of Germany . |
| 719011 | 11/1954 | United Kingdom . |
| 775973 | 5/1957 | United Kingdom . |
| 907799 | 10/1962 | United Kingdom . |
| 964113 | 7/1964 | United Kingdom . |
| 1139267 | 1/1969 | United Kingdom . |
| 1177224 | 1/1970 | United Kingdom . |
| 1312901 | 4/1973 | United Kingdom . |
| 1387156 | 3/1975 | United Kingdom . |
| 1398299 | 6/1975 | United Kingdom . |
| 1435524 | 5/1976 | United Kingdom . |
| 1437786 | 6/1976 | United Kingdom . |
| 1463656 | 2/1977 | United Kingdom . |

*Primary Examiner*—Allan Lieberman
*Attorney, Agent, or Firm*—Stevens, Davis, Miller & Mosher

[57] ABSTRACT

Tires having good grip on wet road surfaces and low frictional resistance to rolling on the road surface have treads formed from vulcanisates of elastomer compositions comprising a major component consisting of one or more polymers having a glass transition temperature (Tg) of minus 50° C. or lower temperature, and a minor component consisting of one or more polymers having a glass transition temperature of ambient temperature or higher temperature. The major component can consist of one or more rubbery polymers selected from natural rubbers, polybutadienes synthetic polyisoprenes and rubbery styrene-butadiene copolymers; and the minor component can consist of a resinous styrene-butadiene co-polymer.

1 Claim, 12 Drawing Figures

ELASTOMER COMPOSITIONS

This is a continuation of application Ser. No. 937,194 filed Aug. 28, 1978, now abandoned.

This invention relates to elastomer compositions, to vulcanised compositions obtained by vulcanising them and to tires containing said vulcanised compositions.

In designing tires for road vehicles it is normally desirable to seek maximum grip on wet road surfaces and minimum frictional resistance to rolling of the tire on the road surface. Unfortunately, the one property is, in general, improved only at the expense of the other, and in consequence the design tends to be a compromise insofar as the selection of elastomer used for the tread portion of the tire is concerned.

We have now found according to the present invention that excellent combinations of grip on wet road surfaces and rolling resistance can be obtained by using in the tread portion of the tires vulcanised elastomer compositions containing blends of polymers having low glass transition temperatures with polymers having high glass transition temperatures.

Accordingly, a first aspect of the invention provides an elastomer composition comprising a major component consisting of one or more polymers having a low glass transition temperature (as hereinafter defined), and a minor component consisting of one or more polymers having a high glass transition temperature (as hereinafter defined).

Glass transition temperature (Tg) can be measured by various known methods. In this specification it is defined as the temperature at which there is a change in the shape of a curve of volume plotted against temperature as measured by dilotometry. In the glassy state there is a lower volume coefficient of expansion than in the rubbery state, thus producing the change in shape of said curve. As used herein "low glass transition temperature" is one of minus 50° C. or lower temperature, and "high glass transition temperature" is one of ambient temperature (15° C.) or higher temperature.

Reference to "major" and "minor" components relate to the weight of each component as a proportion of the total weight of the major and minor components. The size of the minor component depends on the glass transition temperature of the polymer or polymers it contains, but in general it can, for example, constitute up to 45% by weight of said total weight, and especially a proportion in the range from 3 to 25%.

Polymers having high glass transition temperatures are, for example, polymers (for example styrene-butadiene or other styrene copolymers) containing a substantial proportion of styrene. Suitable styrene copolymers, for example, are copolymers whose properties in general at ambient temperatures (say 15° C.) are such that the copolymer is to be regarded as being more resinous than elastomeric in character. Where the styrene copolymer is one consisting substantially of styrene and butadiene, examples of suitable proportions of styrene are in the range from 50 to 90%, for instance 80–90% styrene. Examples of suitable commercial resinous styrene-butadiene copolymers are those sold by Goodyear Company under the trade mark Pliolite 6SF and Pliolite 6SH, which have styrene contents in the range 85–90% by weight. Other suitable polymers for use in the minor component are various styrene-butadiene rubbers.

Polymers having low glass transition temperatures (as hereinbefore defined) are for example natural rubbers, polybutadienes and polyisoprenes.

The unvulcanised elastomer compositions of the first aspect of the invention can be vulcanised, for example using the procedures referred to below in the Examples, to produce vulcanised compositions which constitute a second aspect of the invention. These vulcanised compositions can, for example, be in the form of tires. Accordingly, a third aspect of the invention is tires whose tread portion comprises a vulcanised composition according to the second aspect of the invention.

The invention is illustrated by the following Examples in which the amounts of ingredients are amounts by weight unless stated otherwise.

In the Examples some of the ingredients are referred to simply by their trade names. The nature of those ingredients and their glass transition temperatures (as hereinbefore defined) where appropriate, is as follows:

| Trade Name | Material | Tg(°C.) |
|---|---|---|
| SMR 20 | a natural rubber | minus 70 |
| Intene NF 45 | polybutadiene of high cis content (95% or more) | minus 105 |
| LTP 1502 | a styrene-butadiene rubber | minus 55 |
| Natsyn 2200 | a synthetic polyisoprene of high cis content (98% or more) | minus 70 |
| IR309 | a synthetic polyisoprene of a low cis content (less than 92%) | minus 70 |
| OEP1712 | an oil-extended styrene-butadiene copolymer comprising 100 parts of a styrene butadiene copolymer (comprising 23 parts styrene and 77 parts butadiene and having a Tg of minus 55° C.) and 37 parts of extending oil | |
| Pliolite 6SF and Pliolite 6SH | resinous styrene-butadiene copolymers having styrene contents in the range from 85% to 90% of the copolymer | 90 |
| Hyvis 30 | a low molecular weight polyisobutylene having a viscosity average molecular weight of about 1,000 | |
| Vistonex MML 100 | a high molecular weight polyisobutylene having a viscosity average molecular weight in the range from 1,060,000 to 1,440,000 | |
| CBS | an accelerator | |
| Arrconnox GP | an antioxidant comprising 75% BLE and 25% of a silicate | |
| I.P.P.D. | N—isopropyl-N'—phenyl-p-phenylene diamine. | |

EXAMPLES 1–4

Four natural rubber compositions were obtained by blending together the following ingredients. It will be seen that Examples 2, 3 and 4 which are examples of elastomer compositions of the invention, differ from Example 1 (which is for the purpose of comparison) in that in them part of the natural rubber is replaced by 10, 20 and 30 parts, respectively, of Pliolite 6SH.

| | Example Number | | | |
|---|---|---|---|---|
| | 1 | 2 | 3 | 4 |
| SMR 20 | 100.00 | 90.00 | 80.00 | 70.00 |
| Pliolite 6SH | — | 10.00 | 20.00 | 30.00 |
| Zinc Oxide | 4.00 | | | |

|  | Example Number | | | |
|---|---|---|---|---|
| | 1 | 2 | 3 | 4 |
| Stearic Acid | 2.00 | | | |
| Sulphur | 1.50 | | | |
| MBS | 1.00 | | | |
| Arrconnox DP | 1.00 | | | |
| I.P.P.D. | 1.00 | | | |
| Paraffin Wax | 1.00 | | | |
| N326 Black | 53.00 | | | |

EXAMPLES 5-8

Four polyisoprene compositions were obtained by blending together the following ingredients. It will be seen that Examples 6, 7 and 8, which are further examples of elastomer compositions of the invention, differ from Example 5 (which is for the purpose of comparison) in that in them part of the polyisoprene is replaced by 10, 20 and 30 parts, respectively, of Pliolite 6SH.

|  | Example Number | | | |
|---|---|---|---|---|
| | 5 | 6 | 7 | 8 |
| Natsyn 2200 | 100.00 | 90.00 | 80.00 | 70.00 |
| Pliolite 6SH | — | 10.00 | 20.00 | 30.00 |
| Zinc Oxide | 4.00 | | | |
| Stearic Acid | 2.00 | | | |
| Sulphur | 1.50 | | | |
| MBS | 1.00 | | | |
| Arrconnox GP | 1.00 | | | |
| I.P.P.D. | 1.00 | | | |
| Paraffin Wax | 1.00 | | | |
| N326 Black | 53.00 | | | |

The four polyisoprene compositions were vulcanised, and the mechanical properties and power loss figures for the vulcanisate of Example 6 were as follows:

| Tensile strength | MPa | 21.6 |
|---|---|---|
| Stress @ 300% | MPa | 11.0 |
| Elongation @ break | % | 505 |
| Hardness | IRHD | 84.9 |
| Resilience @ 50° C. | % | — |

| Power loss | | 50° C. | 80° C. | 100° C. |
|---|---|---|---|---|
| Elastic modulus (E') | MPa | 9.35 | 6.29 | 5.60 |
| Loss modulus (E") | MPa | 1.71 | 0.92 | 0.69 |
| Loss factor (E"/E') | | 0.183 | 0.146 | 0.123 |
| $E''/(E^*)^2$ | MPa$^{-1}$ | 0.0189 | 0.0227 | 0.0216 |

EXAMPLE 9

A further natural rubber composition was obtained by blending together the ingredients shown below which are followed by mechanical properties and power loss figures for the resulting vulcanisate.

| SMR 20 | | 90.00 |
|---|---|---|
| Pliolite 6SH | | 10.00 |
| Renacit VII | | 0.15 |
| Zinc oxide | | 4.00 |
| Stearic acid | | 2.00 |
| Sulphur | | 1.35 |
| MBS | | 0.90 |
| IPPD | | 1.00 |
| Arrconnox GP | | 1.00 |
| Paraffin Wax | | 1.00 |
| N110 black | | 30.00 |
| N326 black | | 15.00 |
| Tensile strength | MPa | 27.0 |
| Stress @ 300% | MPa | 14.0 |
| Elongation @ break | % | 480 |
| Hardness | IRHD | 71.5 |
| Resilience @ 50° C. | % | 64.4 |

| Power loss | | 50° C. | 80° C. | 100° C. |
|---|---|---|---|---|
| Elastic modulus (E') | MPa | 5.96 | 4.63 | 4.26 |
| Loss Modulus (E") | MPa | 0.81 | 0.51 | 0.37 |
| Loss factor (E"/E') | | 0.137 | 0.109 | 0.087 |
| $E''/(E^*)^2$ | MPa$^{-1}$ | 0.0225 | 0.0235 | 0.0205 |

EXAMPLE 10

A styrene-butadiene rubber composition was obtained by blending together the ingredients shown below which are followed by the mechanical properties and power loss figures for the resulting vulcanisate.

| OPE 1712 | | 67.50 |
|---|---|---|
| LTP 1502 | | 22.50 |
| Pliolite 6SH | | 10.00 |
| N339 black | | 55.00 |
| Enerflex 94 | | 15.00 |
| Arrconnox GP | | 1.33 |
| IPPD | | 0.75 |
| Zinc oxide | | 2.50 |
| Stearic acid | | 1.00 |
| MBS | | 0.80 |
| Sulphur | | 1.60 |
| 40 mesh rubber crumb | | 8.00 |
| PVI-50 | | 0.20 |
| Tensile strength | MPa | 16.2 |
| Stress @ 300% | MPa | 9.2 |
| Elongation @ break | % | 480 |
| Hardness | IRHD | 71.3 |
| Resilience @ 50° C. | % | 37.5 |

| Power loss | | 50° C. | 80° C. | 100° C. |
|---|---|---|---|---|
| Elastic modulus (E') | MPa | 6.19 | 3.96 | 3.69 |
| Loss modulus (E") | MPa | 1.53 | 0.64 | 0.52 |
| Loss factor (E"/E') | | 0.248 | 0.163 | 0.141 |
| $E''/(E^*)^2$ | MPa$^{-1}$ | 0.0377 | 0.0400 | 0.0374 |

EXAMPLE 11

A composition comprising a low temperature styrene-butadiene and a low molecular weight polyisobutylene was obtained by blending together the following ingredients.

| LTP 1502 | 90.00 |
|---|---|
| Pliolite 6SH | 10.00 |
| Hyvis 30 | 50.00 |
| Zinc oxide | 2.50 |
| Stearic acid | 1.00 |
| MBS | 0.80 |
| Sulphur | 1.60 |
| PVI-50 | 0.20 |
| Arrconnox GP | 1.33 |
| IPPD | 0.75 |
| N234 black | 60.00 |

The composition was vulcanised at 140° C. for 40 minutes. The mechanical properties and power loss figures for the resulting vulcanisate are as follows:

| Tensile strength | MPa | 8.6 |
|---|---|---|
| Stress @ 300% | MPa | 6.7 |
| Elongation at break | % | 350 |
| Hardness | IRHD | 60.9 |
| Resilience @ 50° C. | % | 33.9 |

| Power loss | | 50° C. | 80° C. | 100° C. |
|---|---|---|---|---|
| Elastic modulus (E') | MPa | 3.85 | 2.02 | 1.61 |
| Loss modulus (E") | MPa | 1.04 | 0.55 | 0.46 |
| Loss factor (E"/E') | | 0.270 | 0.273 | 0.285 |
| $E''/(E^*)^2$ | MPa$^{-1}$ | 0.0654 | 0.1255 | 0.1639 |

EXAMPLE 12

A further composition of the invention was obtained by blending together the following ingredients. The composition was vulcanised at 140° C. for 40 minutes and the mechanical properties and power loss figures for the resulting vulcanisate are given below:

| SMR 20 | | 50.00 | | |
|---|---|---|---|---|
| Vistonex MML 100 | | 50.00 | | |
| Pliolite 6SH | | 5.00 | | |
| Zinc oxide | | 5.00 | | |
| Stearic acid | | 1.00 | | |
| Sulphur | | 2.50 | | |
| CBS | | 0.50 | | |
| Arrconnox GP | | 1.00 | | |
| IPPD | | 1.00 | | |
| Paraffin wax | | 1.00 | | |
| Mineral oil | | 5.00 | | |
| N110 black | | 25.00 | | |
| N660 black | | 25.00 | | |
| Tensile strength | MPa | 11.9 | | |
| Stress @ 300% | MPa | 9.0 | | |
| Elongation @ break | % | 380 | | |
| Hardness | IRHD | 64.6 | | |
| Resilience @ 50° C. | % | 61.4 | | |
| Power loss | | 50° C. | 80° C. | 100° C. |
| Elastic modulus (E') | MPa | 6.21 | 5.16 | 4.91 |
| Loss modulus (E'') | MPa | 0.86 | 0.57 | 0.48 |
| Loss factor (E''/E') | | 0.138 | 0.111 | 0.097 |
| E''/(E*)$^2$ | MPa$^{-1}$ | 0.0218 | 0.0212 | 0.0195 |

For the purposes of further comparison two rubber compositions of conventional formulation were obtained by blending together the following ingredients:

| | Parts by weight |
|---|---|
| Comparative composition T | |
| SMR-20 natural rubber | 80.00 |
| IR309 | 20.00 |
| (low cis-polyisoprene) | |
| N375 black | 52.50 |
| Santocure M.O.R. | 0.70 |
| P.V.I.-50 | 0.40 |
| Stearic acid | 2.00 |
| Zinc oxide | 4.00 |
| Dutrex R.T. oil | 6.00 |
| Arrconnox GP | 2.00 |
| I.P.P.D. | 0.50 |
| Paraffin wax | 1.00 |
| 40 mesh rubber crumb | 5.00 |
| Sulphur | 2.50 |
| | 176.60 |
| Comparative composition C | |
| OEP 1712 | 77.50 |
| SBR 1502 | 22.50 |
| N339 black | 60.00 |
| Dutrex R.T. oil | 5.00 |
| Process Oil | 5.00 |
| Arrconnox GP | 1.33 |
| I.P.P.D. | 0.75 |
| Zinc oxide (indirect) | 2.50 |
| Stearic acid | 1.00 |
| Sulphur | 1.75 |
| MBS | 1.00 |
| Vulcatard A (vulcanisation retarder) | 0.40 |
| 40 mesh rubber crumb | 5.00 |
| | 183.73 |

The compositions of Examples 6, 9, 10, 11 and 12 have been tested to assess their wet grip and rolling resistance properties on a road surface. Each of those compositions was used as the tread compound of model cross ply tires of size 2.25-8 (dimensions in inches). These model tires were subjected to two tests as follows.

Grip on a wet Delugrip road surface (Delugrip is a Trade Mark) was measured using the variable speed internal drum machine (VSIDM) described in a paper by G. Lees and A. R. Williams in Journal of the Institute of the Rubber Industry, Vol. 8, No. 3, June 1974. Measurements of the wet grip were made for both peak and locked wheel friction at speeds of 16, 32, 48, 64, 80 and 96 Km/hour) (10, 20, 30, 40, 50 and 60 mph) respectively. Rolling resistance was measured using the dynamics machine described in U.K. Pat. No. 1,392,033. Measurements were made at speeds of 20, 40, 60 and 80 km/hour respectively.

Figure 2:
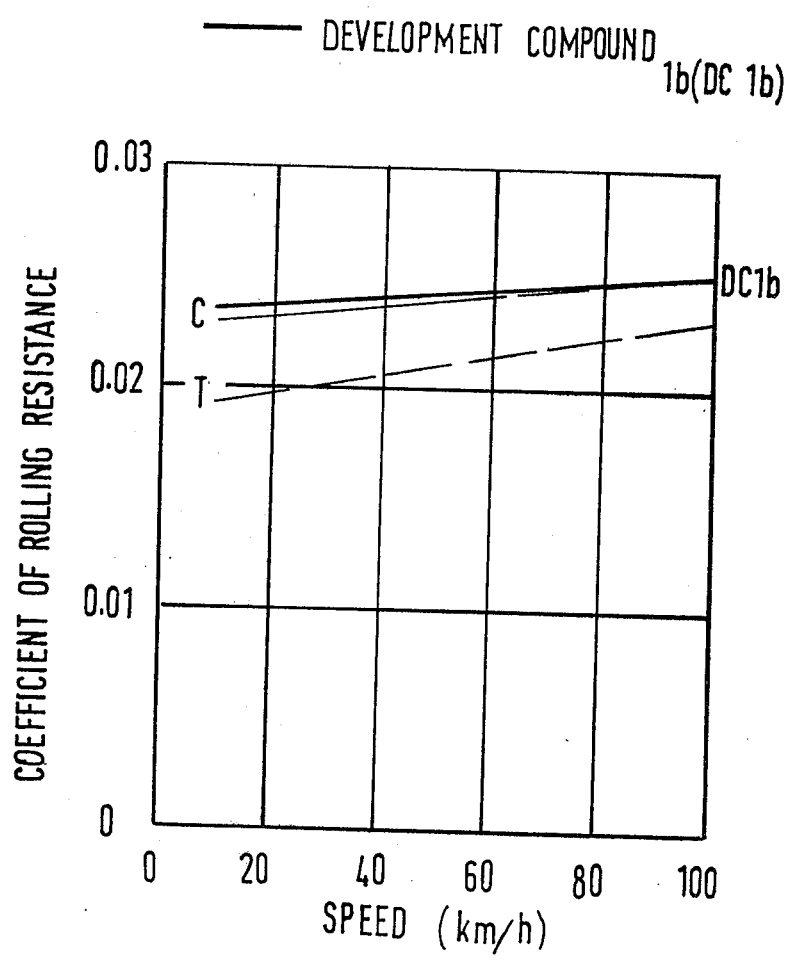
Figure 3:
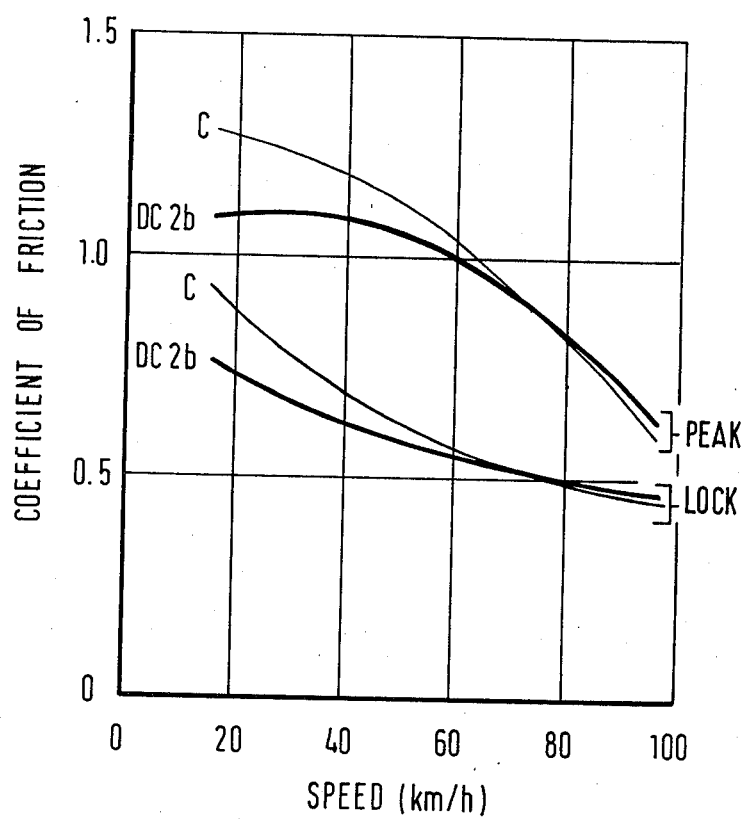
Figure 4:
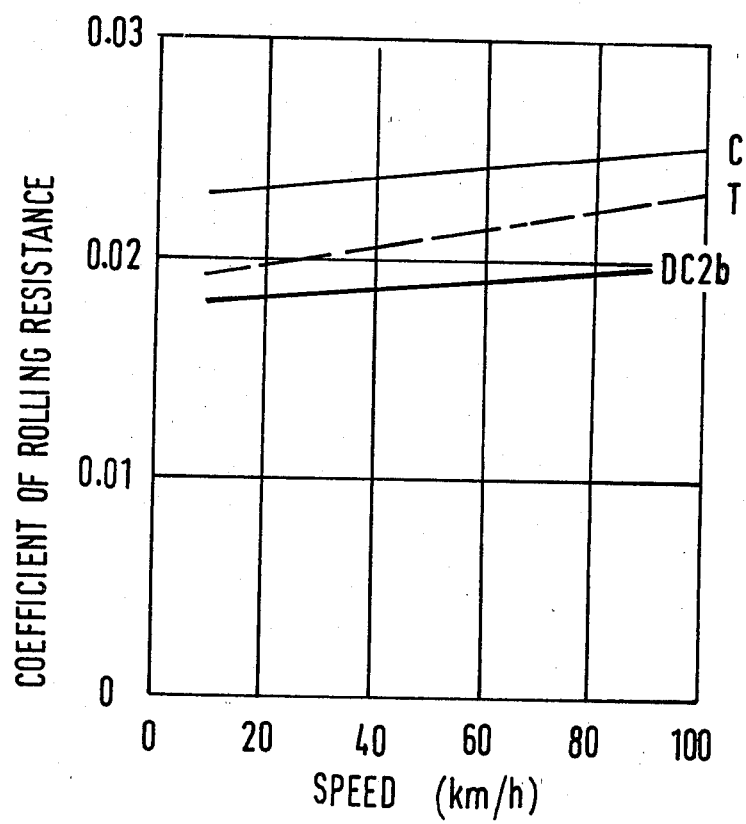
Figure 5:
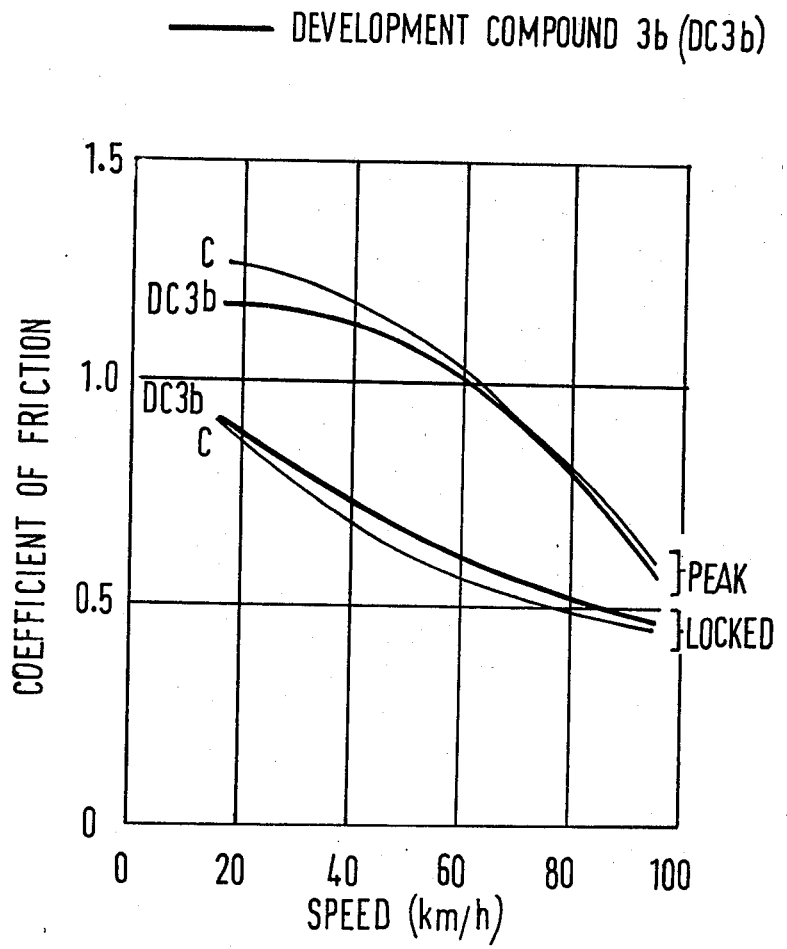
Figure 6:
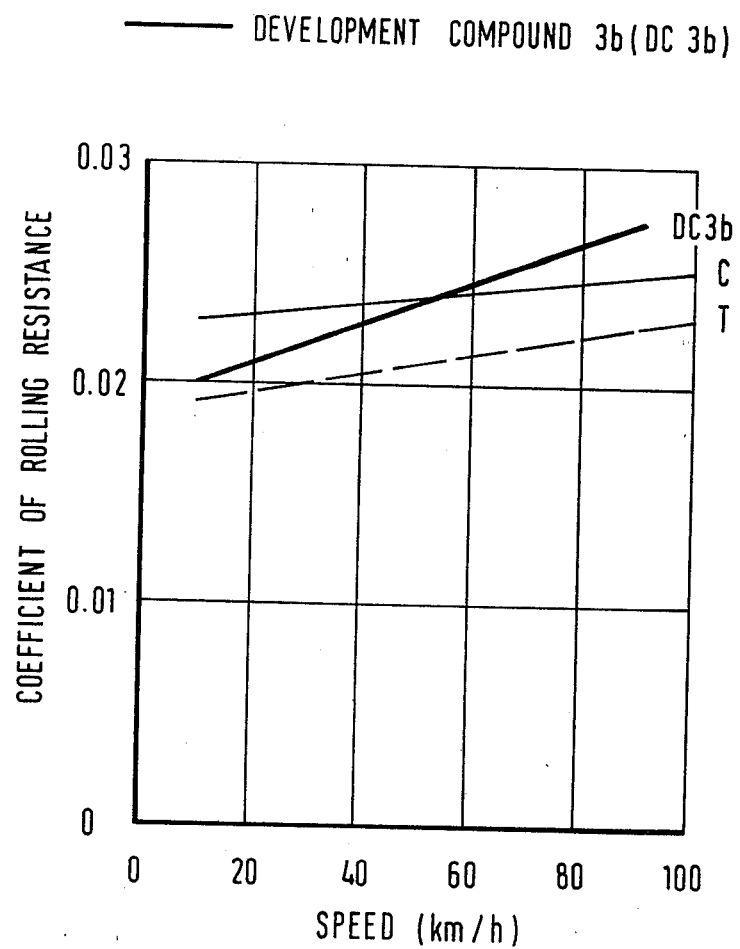
Figure 9:
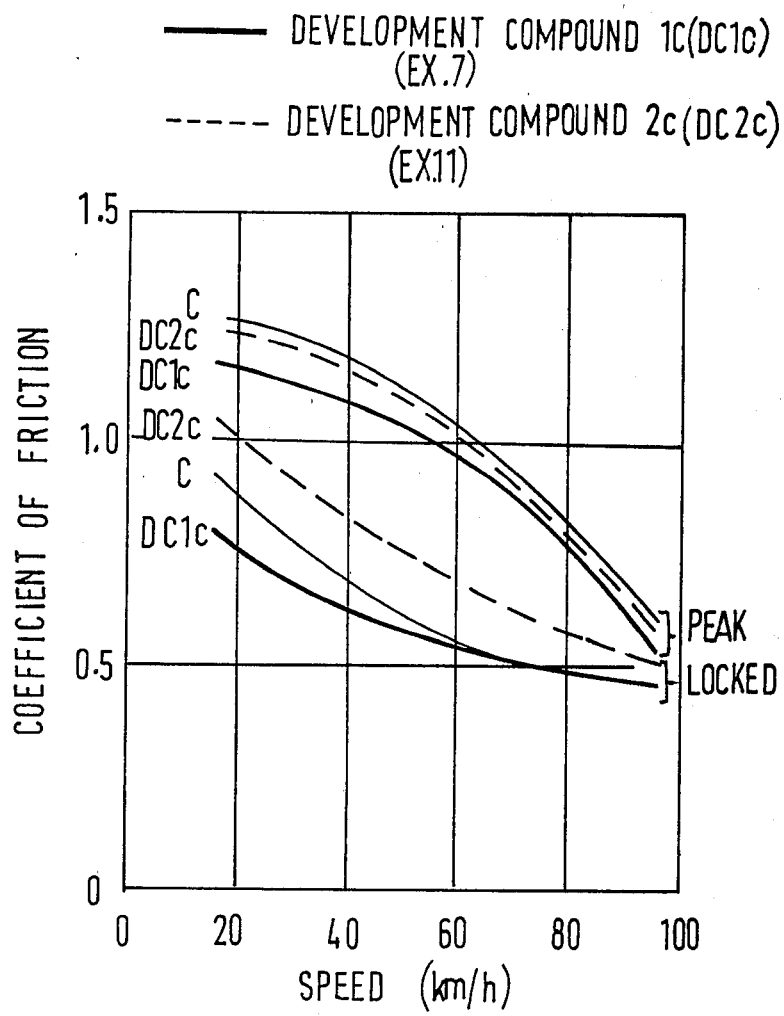
Figure 10:
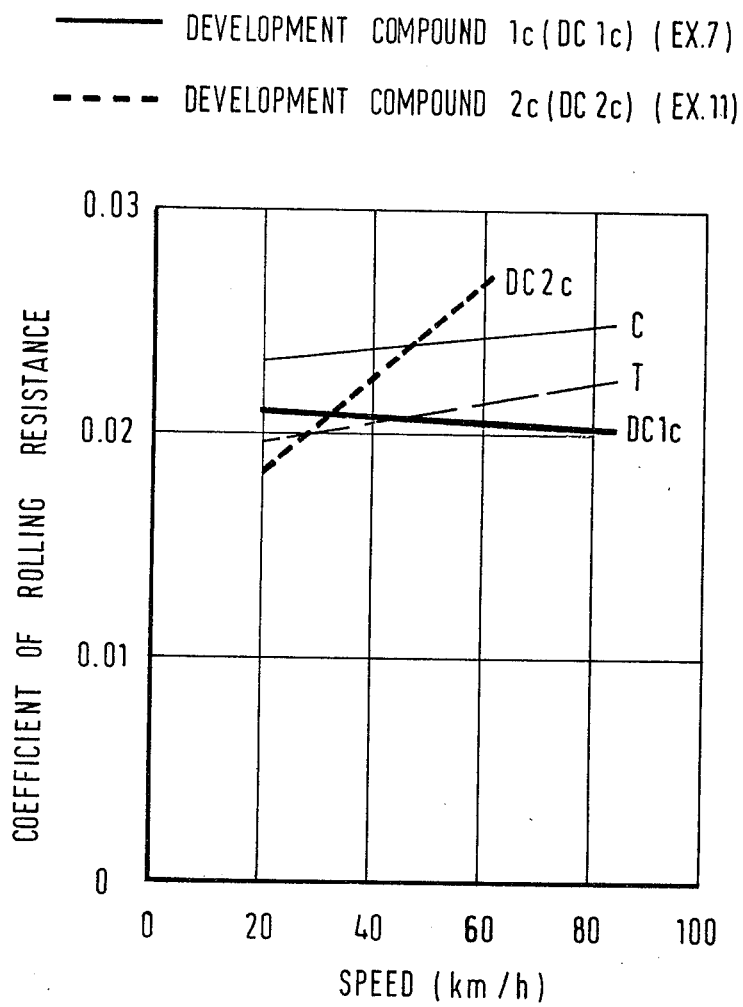
Figure 11:
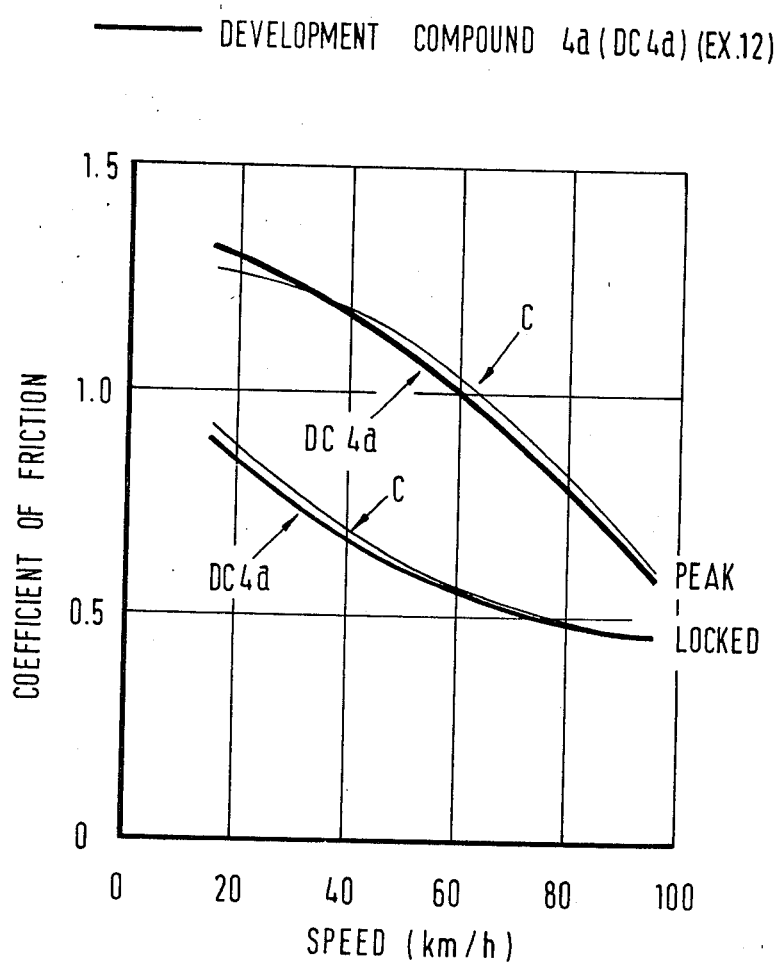
Figure 12:
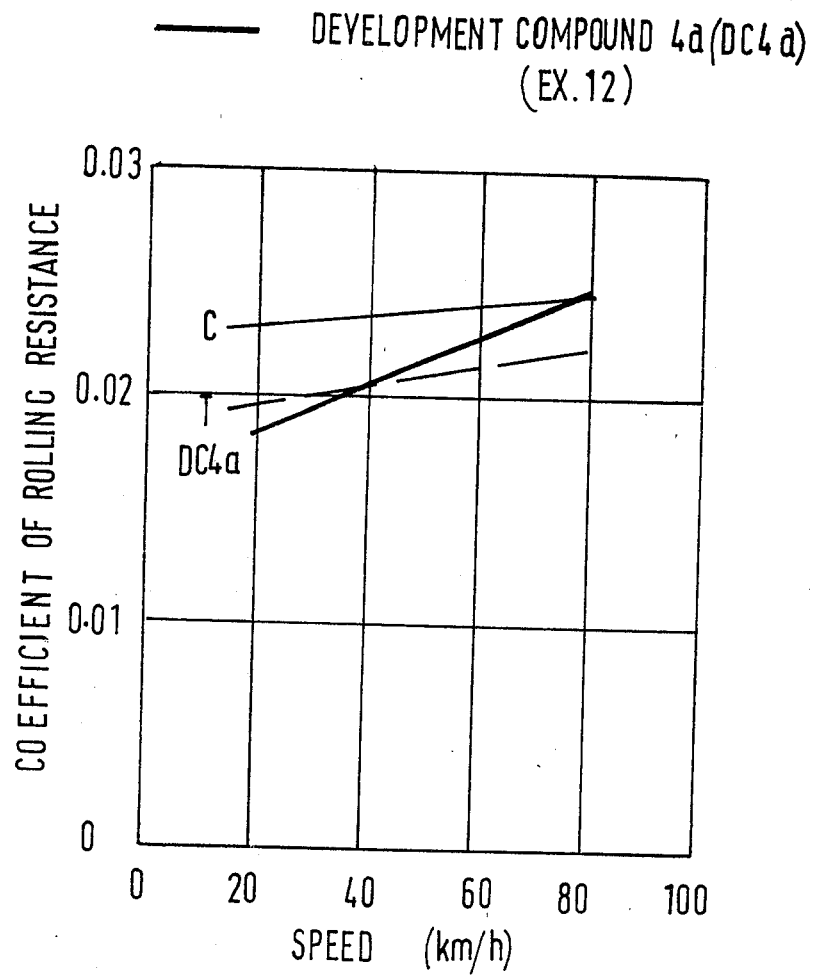

The results obtained from these tests are shown graphically in FIGS. 1 and 2 (relating to Example 6), FIGS. 3 and 4 (relating to Example 9), FIGS. 5 and 6 (relating to Example 10, FIGS. 9 and 10 (relating to Example 11) and FIGS. 11 and 12 (relating to Example 12) of the accompanying drawings.

Figure 7:
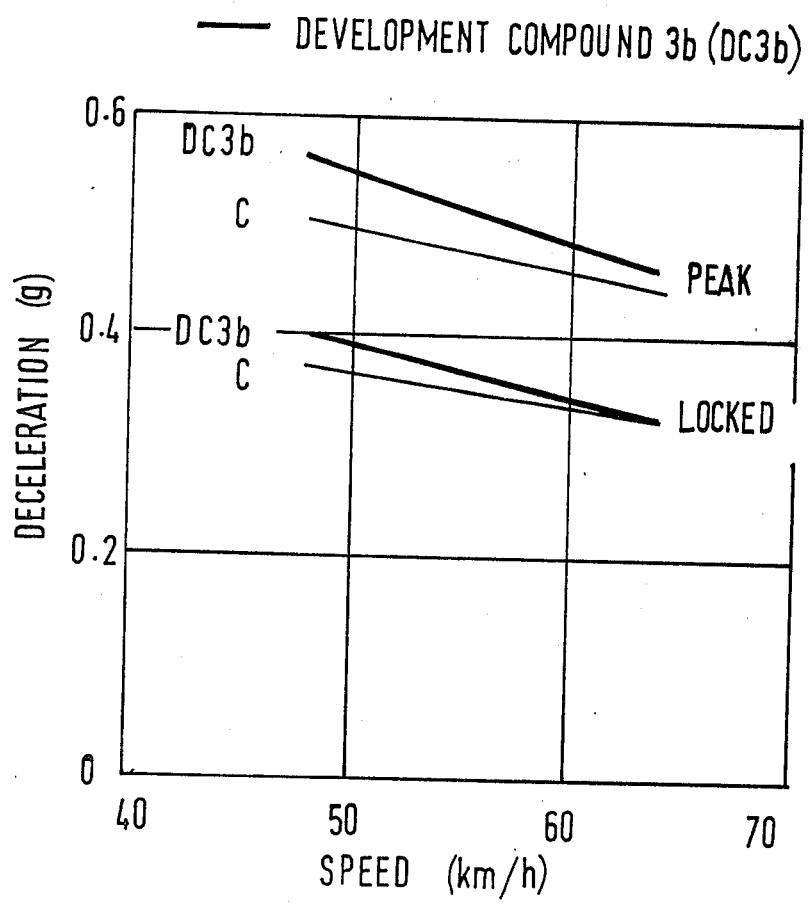
Figure 8:
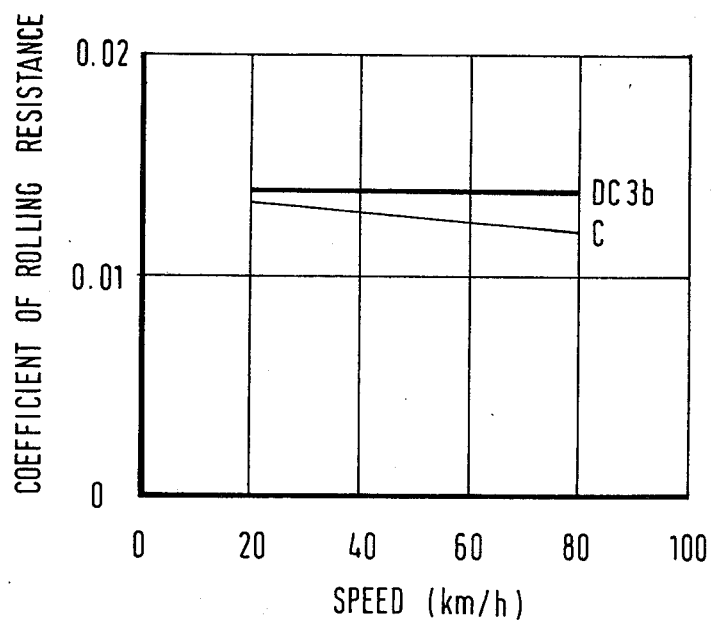

The composition of Example 10 was further tested in the form of a tread compound of 155 SR 13 Dunlop SP4 tires, the rolling resistance being assessed by use of the dynamics machine referred to above and the wet grip by measurements of the deceleration of a Chrysler Avenger car adapted for front wheel braking only fitted with the tires. The results of these further tests are shown in FIGS. 7 and 8 of the accompanying drawings.

In the drawings the thick lines relate to the results obtained with the tires whose treads comprise vulcanised elastomer compositions of the stated Examples of the invention. The thin lines marked "C" or "T" relates respectively to the results obtained with tires whose treads comprise vulcanised comparative elastomer compositions (C or T) referred to above.

Having now described our invention what we claim is:

1. A tire having the combined properties of good grip on a wet road surface and low frictional resistance to rolling on the road, the tread of said tire comprising a material obtained by vulcanizing an elastomer blend comprising:

(a) as a major component a polymer selected from the group consisting of natural rubber, synthetic polyisoprene, rubbery styrene-butadiene copolymer and mixtures thereof having a glass transition temperature at most equal to −50° C.; and (b) as a minor component at least one resinous styrene-butadiene copolymer having a glass transition temperature above 15° C.; said blend being substantially free of polybutadiene and said minor component being present in an amount up to 45% of the total weight of the major and minor components, which amount is effective to product said combined properties, and wherein said resinous styrene-butadiene copolymer has a styrene content in the range from 80–90% by weight.

* * * * *